(12) United States Patent
Jenks et al.

(10) Patent No.: US 11,055,314 B1
(45) Date of Patent: Jul. 6, 2021

(54) TECHNIQUES FOR A DATABASE-DRIVEN MESSAGING USER INTERFACE

(71) Applicant: Facebook, Inc., Menlo Park, CA (US)

(72) Inventors: Jason Curtis Jenks, Lynwood, WA (US); Joshua Scott Evenson, Brentwood, CA (US); Mohsen Agsen, Menlo Park, CA (US); Jeremy David Fein, New York, NY (US); Philippe Vincent Ajoux, San Mateo, CA (US)

(73) Assignee: FACEBOOK, INC., Menlo Park, CA (US)

( * ) Notice: Subject to any disclaimer, the term of this patent is extended or adjusted under 35 U.S.C. 154(b) by 147 days.

(21) Appl. No.: 16/237,273

(22) Filed: Dec. 31, 2018

(51) Int. Cl.
| | |
|---|---|
| *G06F 17/00* | (2019.01) |
| *G06F 16/27* | (2019.01) |
| *H04L 12/58* | (2006.01) |
| *G06F 9/451* | (2018.01) |
| *G06F 16/242* | (2019.01) |
| *G06F 16/23* | (2019.01) |
| *G06F 16/245* | (2019.01) |

(52) U.S. Cl.
CPC .............. *G06F 16/27* (2019.01); *G06F 9/451* (2018.02); *G06F 16/2379* (2019.01); *G06F 16/245* (2019.01); *G06F 16/2428* (2019.01); *H04L 51/32* (2013.01)

(58) Field of Classification Search
None
See application file for complete search history.

(56) References Cited

U.S. PATENT DOCUMENTS

| | | | |
|---|---|---|---|
| 5,600,834 | A | 2/1997 | Howard |
| 5,634,122 | A | 5/1997 | Loucks et al. |
| 5,754,306 | A | 5/1998 | Taylor et al. |
| 5,832,218 | A | 11/1998 | Gibbs et al. |
| 5,951,638 | A | 9/1999 | Hoss et al. |
| 6,487,469 | B1 * | 11/2002 | Formenti ........... G06Q 10/0631 700/97 |
| 6,487,560 | B1 | 11/2002 | LaRue et al. |
| 6,691,300 | B1 | 2/2004 | Alexander et al. |
| 6,735,169 | B1 | 5/2004 | Albert et al. |
| 6,970,907 | B1 | 11/2005 | Ullmann et al. |
| 6,983,308 | B1 | 1/2006 | Oberhaus et al. |
| 7,080,371 | B1 | 7/2006 | Arnaiz et al. |

(Continued)

OTHER PUBLICATIONS

Author Unknown, "Why Threaded Conversations Are Better on Samepage", SamePage—2018.

(Continued)

*Primary Examiner* — Hasanul Mobin
(74) *Attorney, Agent, or Firm* — Kacvinsky Daisak Bluni PLLC

(57) ABSTRACT

Techniques for a database-driven messaging user interface are described. In one embodiment, an apparatus may comprise a database access component operative to determine that a local messaging database of a messaging client on a client device has been updated; and examine the local messaging database to determine a set of database queries to rerun for a plurality of local user interface components; and the local user interface components operative to refresh based on running the set of database queries against the local messaging database. Other embodiments are described and claimed.

20 Claims, 12 Drawing Sheets

(56) References Cited

U.S. PATENT DOCUMENTS

| | | |
|---|---|---|
| 7,103,634 B1 | 9/2006 | Ullmann et al. |
| 7,130,885 B2 | 10/2006 | Chandra et al. |
| 7,328,242 B1 | 2/2008 | McCarthy et al. |
| 7,568,007 B2 | 7/2009 | Narayanaswami et al. |
| 7,672,924 B1 * | 3/2010 | Scheurich ........... G06F 16/2423 |
| | | 707/999.002 |
| 7,941,560 B1 | 5/2011 | Friesen et al. |
| 8,346,864 B1 | 1/2013 | Amidon et al. |
| 8,527,986 B1 | 9/2013 | Mojica et al. |
| 8,577,967 B1 | 11/2013 | Chavez et al. |
| 9,069,825 B1 * | 6/2015 | Chang ................ G06F 16/9535 |
| 9,106,642 B1 | 8/2015 | Bhimanaik |
| 9,185,063 B1 | 11/2015 | Kumar |
| 9,231,949 B1 | 1/2016 | Jenkins et al. |
| 9,326,016 B2 | 4/2016 | Grasset |
| 9,460,198 B1 | 10/2016 | Aman |
| 9,535,685 B1 | 1/2017 | Wang et al. |
| 9,692,701 B1 | 6/2017 | Chu et al. |
| 9,740,713 B1 * | 8/2017 | Greenwood ........... G06F 16/213 |
| 9,798,787 B1 * | 10/2017 | Beard ................ G06F 16/2455 |
| 9,881,066 B1 * | 1/2018 | Yousaf ................ G06F 3/0482 |
| 10,606,820 B2 | 3/2020 | Iyengar |
| 2002/0059280 A1 | 5/2002 | Slesinsky |
| 2002/0087659 A1 | 7/2002 | Chapman et al. |
| 2004/0260756 A1 | 12/2004 | Forstall et al. |
| 2005/0050104 A1 | 3/2005 | Kadyk et al. |
| 2005/0125432 A1 * | 6/2005 | Lin ....................... G06F 16/289 |
| 2006/0130120 A1 | 6/2006 | Brandyberry et al. |
| 2006/0149828 A1 | 7/2006 | Kikinis |
| 2007/0038642 A1 | 2/2007 | Durgin et al. |
| 2007/0088707 A1 | 4/2007 | Durgin et al. |
| 2008/0077632 A1 | 3/2008 | Tysowski et al. |
| 2008/0201475 A1 | 8/2008 | Kim |
| 2008/0274687 A1 | 11/2008 | Roberts et al. |
| 2009/0177754 A1 | 7/2009 | Brezina et al. |
| 2009/0196179 A1 | 8/2009 | Clark et al. |
| 2009/0198772 A1 | 8/2009 | Kim et al. |
| 2009/0248727 A1 | 10/2009 | Hughes |
| 2010/0011070 A1 | 1/2010 | Zhao et al. |
| 2010/0153335 A1 | 6/2010 | Esteve Balducci et al. |
| 2010/0186024 A1 | 7/2010 | Eker et al. |
| 2011/0202905 A1 | 8/2011 | Mahajan |
| 2012/0096046 A1 | 4/2012 | Kucera |
| 2012/0101985 A1 | 4/2012 | Kemp et al. |
| 2012/0185473 A1 * | 7/2012 | Ponting ................. G06F 16/95 |
| | | 707/728 |
| 2013/0157626 A1 | 6/2013 | Talwar et al. |
| 2013/0157699 A1 | 6/2013 | Talwar et al. |
| 2013/0185649 A1 | 7/2013 | Mahood et al. |
| 2014/0040014 A1 | 2/2014 | Anand et al. |
| 2014/0095432 A1 | 4/2014 | Trumbull et al. |
| 2014/0114913 A1 | 4/2014 | Engelko et al. |
| 2014/0143284 A1 | 5/2014 | McCaffrey |
| 2014/0143358 A1 | 5/2014 | Beausoleil et al. |
| 2014/0310365 A1 | 10/2014 | Sample et al. |
| 2014/0324779 A1 | 10/2014 | Forbes et al. |
| 2015/0058286 A1 | 2/2015 | Leibovici et al. |
| 2015/0212663 A1 * | 7/2015 | Papale ................. G06F 16/248 |
| | | 715/762 |
| 2015/0256504 A1 | 9/2015 | Beausoleil et al. |
| 2015/0304264 A1 | 10/2015 | Kabbes |
| 2015/0324635 A1 | 11/2015 | Tanaka et al. |
| 2015/0370844 A1 | 12/2015 | Chen et al. |
| 2016/0043983 A1 * | 2/2016 | Bishop .................... H04L 51/24 |
| | | 709/206 |
| 2016/0062555 A1 * | 3/2016 | Ward .................... G06F 40/151 |
| | | 715/778 |
| 2016/0381023 A1 | 12/2016 | Dulce et al. |
| 2017/0147337 A1 | 5/2017 | Hamby et al. |
| 2017/0161373 A1 * | 6/2017 | Goyal ................ G06F 16/9035 |
| 2017/0171132 A1 | 6/2017 | Steiner et al. |
| 2017/0228460 A1 * | 8/2017 | Amel ............... G06F 16/24568 |
| 2018/0022453 A1 | 1/2018 | Tian et al. |
| 2018/0026929 A1 | 1/2018 | Nambiar et al. |
| 2018/0131732 A1 | 5/2018 | Aronoff et al. |
| 2018/0191645 A1 | 7/2018 | Cacioppo et al. |
| 2018/0218041 A1 * | 8/2018 | Arthanarisamy ........................... |
| | | G06F 16/24542 |
| 2018/0285201 A1 | 10/2018 | Bangalore et al. |
| 2018/0314603 A1 | 11/2018 | Gibbons, Jr. et al. |
| 2019/0098037 A1 | 3/2019 | Shenoy, Jr. et al. |
| 2019/0102436 A1 | 4/2019 | Bishnoi et al. |
| 2019/0116138 A1 | 4/2019 | Bruggeeman et al. |
| 2020/0045016 A1 * | 2/2020 | Chor ........................ H04L 9/30 |
| 2020/0125582 A1 | 4/2020 | OShaughnessy |

OTHER PUBLICATIONS

Ipodraza—Unread Messages Notification on Apple Watch—Apple.com (Year: 2017).

* cited by examiner

*600*

```
┌─────────────────────────────────────────────┐
│ Determine that a local messaging database   │
│ of a messaging client on a client device    │
│ has been updated.                           │
│                    602                      │
└─────────────────────────────────────────────┘
                      │
┌─────────────────────────────────────────────┐
│ Examine the local messaging database to     │
│ determine a set of database queries to      │
│ rerun for a plurality of local user         │
│ interface components.                       │
│                    604                      │
└─────────────────────────────────────────────┘
                      │
┌─────────────────────────────────────────────┐
│ Refresh the plurality of local user         │
│ interface components based on running the   │
│ set of database queries against the local   │
│ messaging database.                         │
│                    606                      │
└─────────────────────────────────────────────┘
```

*FIG. 6*

TECHNIQUES FOR A DATABASE-DRIVEN MESSAGING USER INTERFACE

RELATED APPLICATIONS

This application is related to the U.S. patent application Ser. No. 16/237,282, titled "Techniques for Directive-Based Messaging Synchronization," filed on Dec. 31, 2018, which is hereby incorporated by reference in its entirety.

This application is related to the U.S. patent application Ser. No. 16/237,060, titled "Techniques for In-Place Directive Execution," filed on Dec. 31, 2018, which is hereby incorporated by reference in its entirety.

This application is related to the U.S. patent application Ser. No. 16/237/289, titled "Techniques for Server-Side Messaging Data Providers,"filed on Dec. 31, 2018, which is hereby incorporated by reference in its entirety.

This application is related to the U.S. patent application Ser. No. 16/237,297, titled "Techniques for Backend-Specific Cursor Tracking," filed on Dec. 31, 2018, which is hereby incorporated by reference in its entirety.

BACKGROUND

Mobile devices may run applications, commonly known as "apps," on behalf of their users. These applications may execute as processes on a device. These application may engage in network activity on the mobile device, such as may use wireless signals, including Wi-Fi, cellular data, and/or other technologies.

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for a database-driven messaging user interface. In one embodiment, for example, an apparatus may comprise a database access component operative to determine that a local messaging database of a messaging client on a client device has been updated; and examine the local messaging database to determine a set of database queries to rerun for a plurality of local user interface components; and the local user interface components operative to refresh based on running the set of database queries against the local messaging database. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
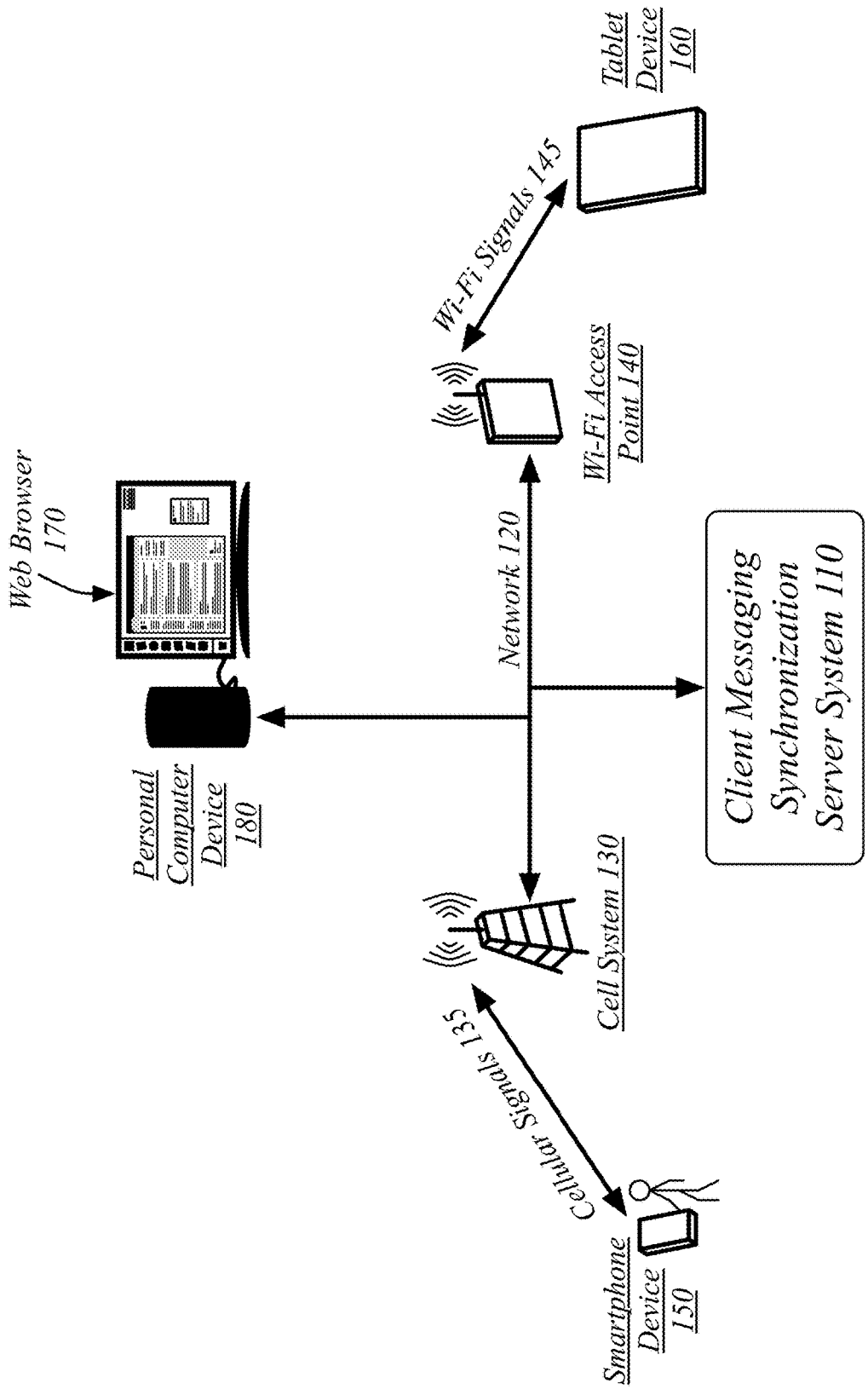
FIG. 1 illustrates an embodiment of a messaging synchronization system.

Users access a messaging system using a messaging client. Messaging servers of the messaging system interoperate with the messaging client to update the state of the messaging client. This may reflect the user receiving a message from another user via the messaging system, information about one or more of a user's contacts, messaging system notifications, or any other providing of information by the messaging system to the messaging client.

Various techniques may be used to update the state of a messaging client. In some embodiments, a messaging system may use a messaging synchronization scheme based around a complex messaging client using a complex messaging synchronization protocol where the synchronization protocol represents each of the various possible synchronization actions (e.g., providing a message, modifying contact state) via explicit synchronization commands each associated with a particular action and predefined in the synchronization protocol and on the messaging client. This technique has multiple disadvantages. The complexity of the client results in a large messaging client in terms of application binary and therefore increases both the storage space used for it on the client and the time used to load the messaging client into active memory on the client device. Further, a great many modifications to the operation of the messaging system involve modifications to the messaging client and therefore an application update on the client device.

Alternatively, a more streamlined synchronization protocol can be used. Instead of a complex synchronization protocol with individual messaging operations individually represented in the protocol, the synchronization protocol is built around updating a local database of the messaging client on the client device. The user interface of the messaging client is built to update itself exclusively using queries to the local database. As such, the messaging client is updated by the messaging servers updating the local database on the client device and then the user interface refreshing based on the updates to the local database. This may result in a smaller binary size for the messaging client as compared to other techniques, reducing the storage space used on the client device and the time used to load the messaging client into memory, increasing responsiveness. Further, many changes to the operation of the messaging client may be implemented by exclusively updating the operation of the messaging servers without any need to update the messaging client application.

Updates to the local database may be performed by sending database-update directives from the messaging servers to the messaging client. Database-update directives are commands instructing the messaging client how to update the local database. The database-update directives use a messaging-database-update command set specific to messaging database updating. A messaging-sync-specific virtual machine in the messaging client executes the database-update directives to update the local database and thereby provide messaging service to the messaging client.

The directives are generated on the messaging servers for the messaging client. The messaging servers generate the directives specifically for the messaging client, based on, for instance, the version of the messaging client as different versions of the messaging client may use different database schema and/or rely on different formats for messaging data.

The messaging servers execute messaging providers to generate the directives. A first layer of messaging providers determine high level operations that are agnostic to the messaging client version. These high level operations represent updates to the messaging client that are more recent than the current state of the messaging client. These high level operations are then translated to version-specific directives by a second layer of messaging providers specific to a particular database schema used by one or more versions of the messaging client. These version-specific directives are then provided to the messaging client to updates it local database.

As such, a messaging system may be implemented with a small, efficient client that uses little storage space on the client device and loads quickly. Further, the messaging system may be more significantly updated without modification of the messaging client application as compared to other synchronization techniques. Further, the messaging provider system may reduce the complexity of supporting multiple client versions.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a messaging synchronization system 100. In one embodiment, the messaging synchronization system 100 may comprise a computer-implemented system having software applications comprising one or more components. Although the messaging synchronization system 100 shown in FIG. 1 has a limited number of elements in a certain topology, it may be appreciated that the messaging synchronization system 100 may include more or less elements in alternate topologies as desired for a given implementation.

The client messaging synchronization server system 110 may comprise one or more client messaging synchronization servers operated by a messaging platform as part of the messaging synchronization system 100. A client messaging synchronization server may comprise an Internet-accessible server, with the network 120 connecting the various devices of the messaging synchronization system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the client messaging synchronization server system 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the client messaging synchronization server system 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the client messaging synchronization server system 110.

A messaging client may be a dedicated messaging client. A dedicated messaging client may be specifically associated with a messaging provider administering the messaging platform including the client messaging synchronization server system 110. A dedicated messaging client may be a general client operative to work with a plurality of different messaging providers including the messaging provider administering the messaging platform including the client messaging synchronization server system 110.

The messaging client may be a component of an application providing additional functionality. For example, a social networking service may provide a social networking application for use on a mobile device for accessing and using the social networking service. The social networking service may include messaging functionality such as may be provided by one or more elements of the client messaging synchronization server system 110. It will be appreciated that messaging servers for the client messaging synchronization server system 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage. The messaging endpoint may use a local store that is replicated across multiple devices, which may include one or both of other client devices and server devices.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may save and retrieve data from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox, application configurations, and/or other data kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the client messaging synchronization server system 110 due to it not maintaining or otherwise not having access to an existing state for the message inbox. The web browser 170 may then retrieve incremental updates for any new changes to the state of the message inbox so long as it maintains a user session with the client messaging synchronization server system 110, discarding its known state for the message inbox at the end of the session, such as when the web browser 170 is closed by the user. Without limitation, an update may correspond to the addition of a message to a mailbox, a deletion of a message from a mailbox, and a read receipt.

The client messaging synchronization server system 110 may use knowledge generated from interactions in between users. The client messaging synchronization server system 110 may comprise a component of a social-networking system and may use knowledge generated from the broader interactions of the social-networking system. As such, to protect the privacy of the users of the client messaging synchronization server system 110 and the larger social-networking system, client messaging synchronization server system 110 may include an authorization server (or other suitable component(s)) that allows users to opt in to or opt out of having their actions logged by the client messaging synchronization server system 110 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the client messaging synchronization server system 110 and other elements of a social-networking system through blocking, data hashing, anonymization, or other suitable techniques as appropriate.

Figure 2:
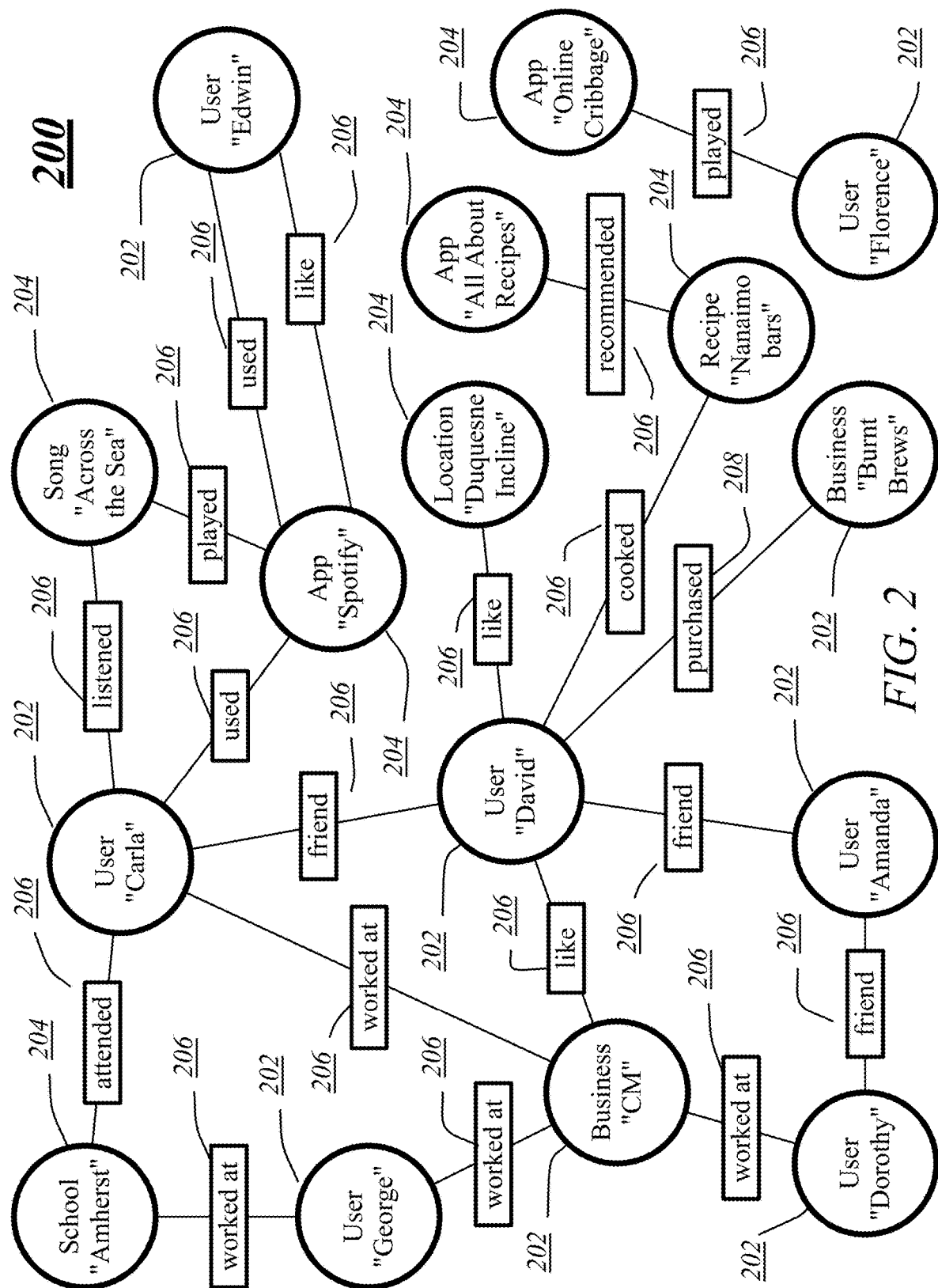
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3:
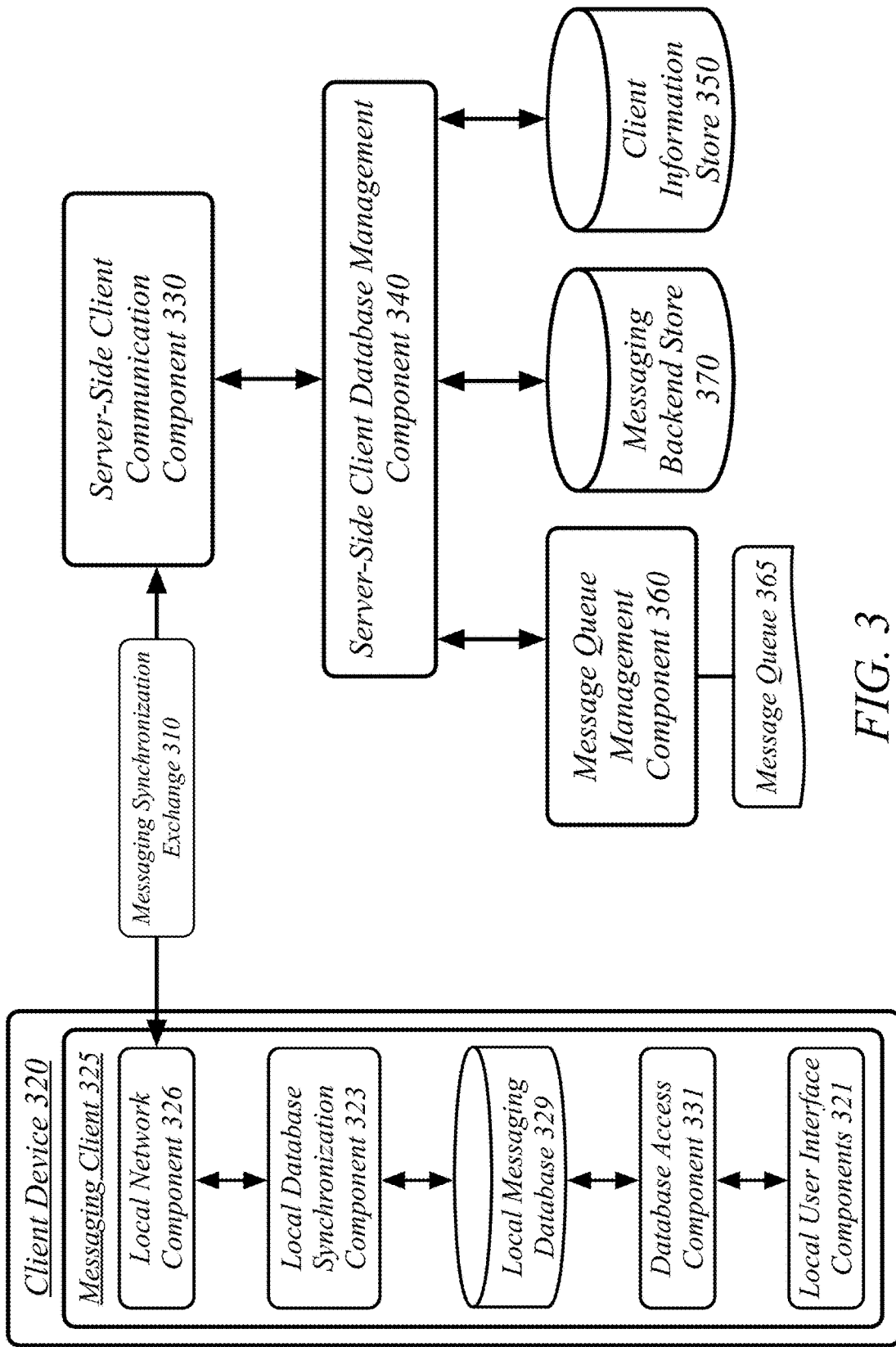
FIG. 3 illustrates an embodiment of a messaging synchronization system performing a messaging synchronization exchange.

FIG. 3 illustrates an embodiment of a messaging synchronization system 100 performing a messaging synchronization exchange 310.

The messaging synchronization system 100 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a local client application.

A client device may communicate with other devices using wireless transmissions to exchange network traffic. Exchanging network traffic, such as may be included in the exchange of messaging or database synchronization transactions, may comprise sending and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and send the network traffic to memory storage accessible to software applications using a network interface application programming interface (API). The network interface controller may be used for the network activities of the embodiments described herein, including the interoperation of the clients and servers through network communication. For example, a client device sending or receiving messaging synchronization information to or from a server may be interpreted as using the network interface controller for network access to a communications network for the sending or receiving of data.

The messaging synchronization system 100 is operative to synchronize a local messaging database 329 with the current user state for a messaging system. The local messaging database 329 is stored on a client device 320 and used with a messaging application for the messaging system. The messaging synchronization system 100 includes a client messaging synchronization server system 110 providing transport for the providing of messaging synchronization information to a client device 320. Providing messaging synchronization information to a client device 320 is performed in a messaging synchronization exchange 310.

The client device 320 may comprise a plurality of components. The components may comprise elements of a local client application comprising a messaging client 325 executing on the client device 320. In general, the local application may comprise, without limitation, a messaging application and/or a social-networking application. In some embodiments, the messaging synchronization may be performed for a local messaging database 329 exclusively used by the messaging application 325 of which the components are an element. In other embodiments, the messaging synchronization may be performed for a local messaging database 329 used by a plurality of applications on the client device 320.

The messaging client 325 on the client device 320 may comprise a local network component 326. The local network component 326 may be generally arranged to manage the messaging synchronization exchange 310 with a server-side client communication component 330 that in which information is exchanged between the client device 320 and the client messaging synchronization server system 110 to provide messaging services to the client device 320.

The messaging client 325 on the client device 320 may comprise a local database synchronization component 323. The local database synchronization component 323 may be generally arranged to update a local messaging database 329 based on the messaging synchronization exchange 310 between the client device 320 and the client messaging synchronization server system 110. The local database synchronization component 323 may receive directives for updating the local messaging database 329 from the client messaging synchronization server system 110 and update the local messaging database 329 by executing the directives.

The messaging client 325 on the client device 320 may comprise a database access component 331. The database access component 331 may be generally arranged to access the local messaging database 329 and to intermediate between the local messaging database 329 and the local user interface components 321. The database access component 331 executes queries on behalf of the local user interface components 321 to provide them with updated data and modifies the local messaging database 329 in response to user interactions with the local user interface components 321.

The messaging client 325 on the client device 320 may comprise a plurality of local user interface components 321. The plurality of local user interface components 321 collectively comprise a user interface for the messaging client to the user of the client device 320 via the hardware components of the client device 320. The user interface may comprise visual elements, auditory elements, and/or other elements. The plurality of local user interface components 321 may be exclusively updated with the local messaging database 329 as an intermediary, such that all information used to update the user interface for the messaging client is provided to the plurality of local user interface components 321 via the modification of local messaging database 329 by directives processed by the local database synchronization component 323.

The client device 320 receives messaging services by interacting with, exchanging information with, a server-side client communication component 330. The server-side client communication component 330 is the access point for the client device 320 to the messaging system, with communication with the server-side client communication component 330 performed via a messaging synchronization exchange 310. The server-side client communication component 330 receives requests and other information from the client device 320 and provides information to the client device 320 from the other components of the messaging synchronization system 100.

A server-side client database management component 340 arranges directives for execution by the local database synchronization component 323 of a client device. The server-side client database management component 340 arranges the directives to, at least in part, deliver messages to the client device 320. Messaging, as well as other information, may be retrieved from a message 365 via a message queue management component, from a messaging backend store 370, and from a client information store 350. The messaging backend store 370 may comprise a long-term message archive that may be used to retrieve archived messages, which may be all messages that aren't sufficiently currently as to have not yet been archived by a message archival process. The client information store 350 may generally store client information other than messages.

A message queue 365 may queue—store and place an ordering on—a plurality of messages. The message queue 365 may comprise a representation of messages in a strict linear order. The message queue 365 may be organized as a data unit according to a variety of techniques. The message queue 365 may be stored in semi-persistent memory, persistent storage, both semi-persistent memory and persistent storage, or a combination of the two. The message queue 365 may be organized according to a variety of data structures, including linked lists, arrays, and other techniques for organizing queues. The message queue 365 may generally comprise a first-in-first-out (FIFO) queue in which no update will be removed or retrieved from the queue before any updates that were received prior to it. The message queue 365 may be managed by a message queue management component 360. The message queue management component 360 is generally arranged to provide messages for distribution to client devices, such as client device 320, to a server-side client database management component 340, which thereafter arranges directives to store the messages in the local messaging database 329 for eventual display to the user of the client device 320.

In some embodiments, a message queue 365 may be specifically associated with the user of client device 320, such as by being uniquely associated within the messaging synchronization system 100 with a user account for the user of client device 320. The message queue 365 may be a single queue used for all client devices used by this user. In these embodiments, each user of the messaging synchronization system 100 may have a message queue associated with their account, this message queue used to send messages to one or more client devices for that user.

Figure 4A:
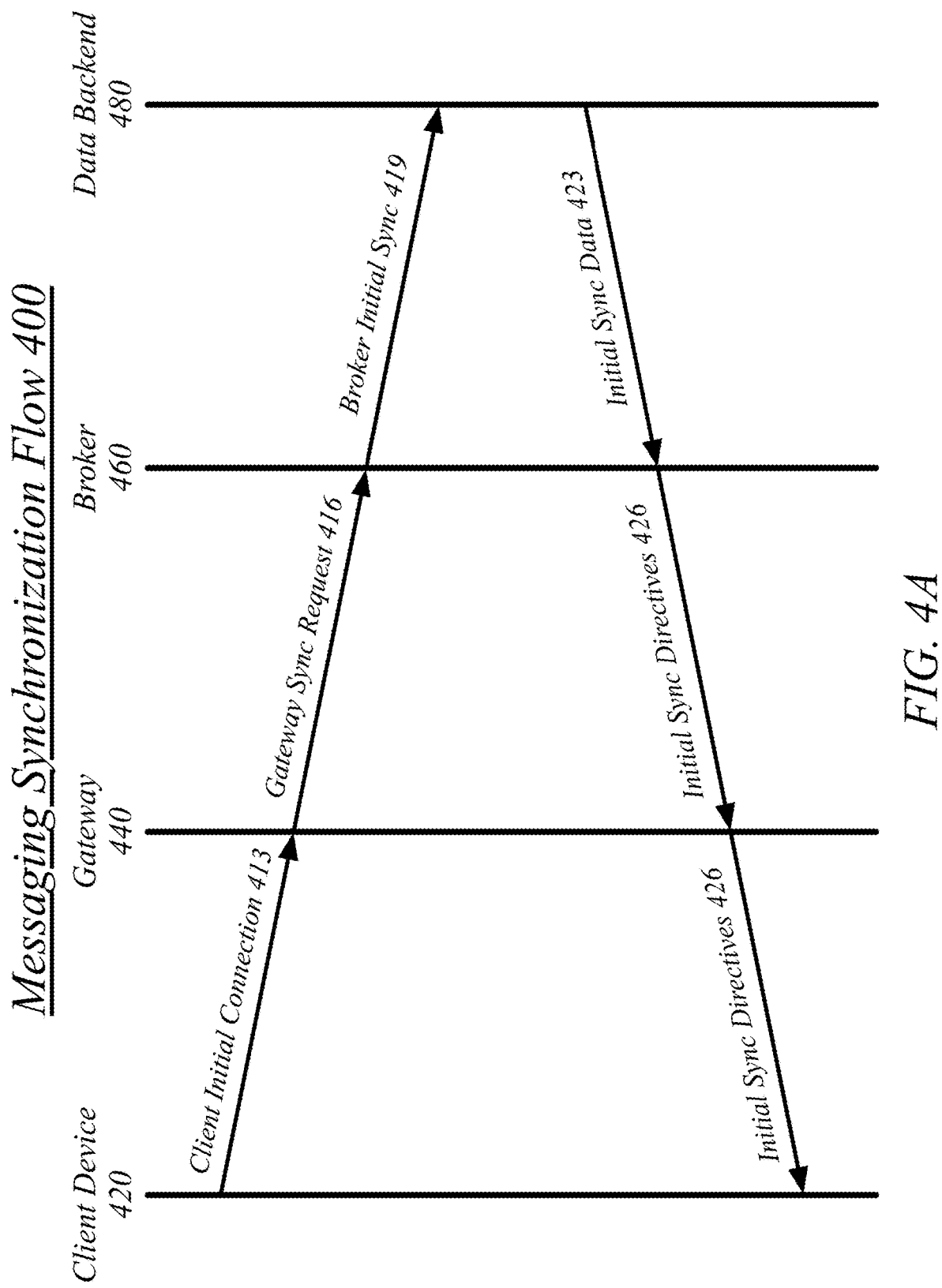
FIG. 4A illustrates an embodiment of a messaging synchronization flow for an initial messaging synchronization of a messaging synchronization system.

FIG. 4A illustrates an embodiment of a messaging synchronization flow 400 for an initial messaging synchronization of a messaging synchronization system 100.

An initial messaging synchronization is performed when a messaging client is initially configured. This may occur when a messaging client is initially installed on a client device 420. This may occur when a user first accesses or creates their account with the messaging system on the client device 420.

The client device 420 performs a client initial connection 413 with a gateway 440. The gateway 440 is the entry point for the client device 420 into the client messaging synchronization server system 110. The gateway 440 corresponds to the server-side client communication component 330 described with reference to FIG. 3. The client initial connection 413 comprises a request to the gateway 440 to start synching a local messaging database for the client device 420, such as the local messaging database 329 described with reference to FIG. 3.

The gateway 440 then performs a gateway sync request 416 with a broker 460 in response to the client initial connection 413. The broker 460 generates the directives used to update the local messaging database of the client device 420. The broker 460 corresponds to the server-side client database management component 340 described with reference to FIG. 3. The gateway sync request 416 requests on behalf of the client device 420 that the broker 460 generate directives to perform the initial synchronization 423 of the client device 420. The gateway sync request 416 includes identifying information associated with the client initial connection 413, such as may include a user identifier for the user of the client device 420, a messaging client identifier for a version of the messaging client, and/or other identifying information.

The broker 460 then performs a broker initial sync 419 with a data backend 480 in response to the gateway sync request 416. The broker initial sync 419 retrieves data from the data backend 480 to perform the initial sync of the client device 420. The data backend 480 may comprise the message queue management component 360, message queue 365, messaging backend store 370, and/or client information store 350 as described with reference to FIG. 3. The data backend 480 may comprise alternatively or additionally comprise other data storage components.

The data backend 480 provides the initial sync data 423 to the broker 460. The broker 460 assembles the initial sync data 423 into directives that, when executed on the client device 420, update the local messaging database on the client device 420 to initialize the messaging state on the client device 420. These initial sync directives 426 are then provided to the gateway 440. The gateway 440 then provides them to the client device 420, which executes them to update its local messaging database.

Figure 4B:
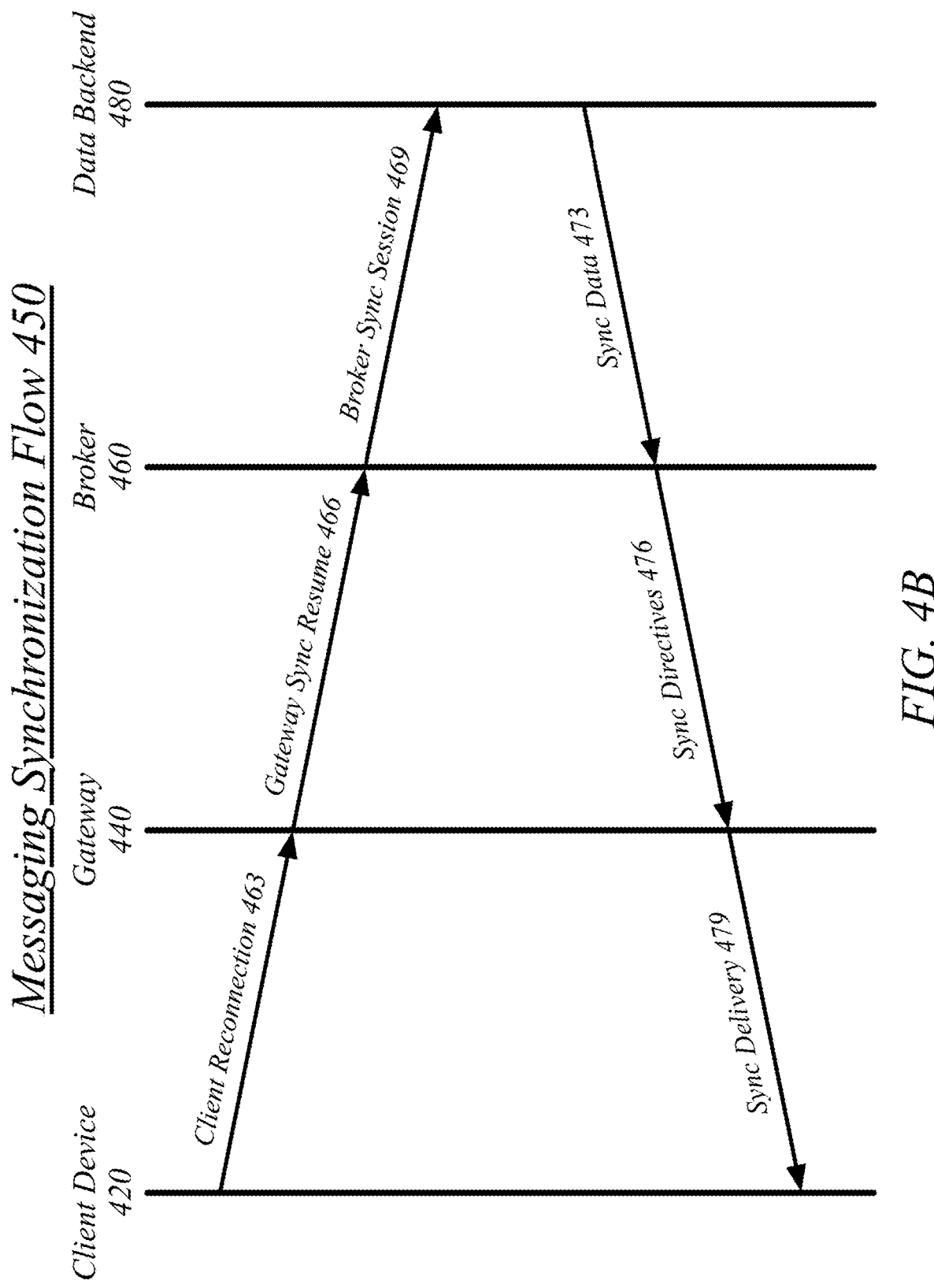
FIG. 4B illustrates an embodiment of a messaging synchronization flow for a messaging synchronization resumption of a messaging synchronization system.

FIG. 4B illustrates an embodiment of a messaging synchronization flow 450 for a messaging synchronization resumption of a messaging synchronization system 100.

A messaging synchronization resumption is performed when a messaging client resumes synchronization with the messaging system. The resumption of synchronization may correspond to a client connecting to the messaging system, via the gateway 440, after an initial synchronization has already been performed. The resumption of synchronization may generally correspond to a client requesting updates from the messaging system.

The client device 420 performs a client reconnection 463 with the gateway 440. The client reconnection 463 comprises a request to the gateway 440 to restart synching of the local messaging database for the client device 420.

The gateway 440 then performs a gateway sync resume 466 with the broker 460 in response to the client reconnection 463. The gateway sync resume 466 requests on behalf of the client device 420 that the broker 460 generate directives to perform the a resumed synchronization of the client device 420. The gateway sync resume 466 includes identifying information associated with the client reconnection 463, such as may include a user identifier for the user of the client device 420, a messaging client identifier for a version of the messaging client, and/or other identifying information.

The broker 460 then performs a broker sync session 469 with the data backend 480 in response to the gateway sync resume 466. The broker sync session 469 retrieves data from the data backend 480 to perform a sync to update the client device 420 to the current state of a user's messaging inbox and general messaging state.

The data backend 480 provides the sync data 473 to the broker 460. The broker 460 assembles the sync data 473 into sync directives 476 that, when executed on the client device 420, update the local messaging database on the client device 420 to the updated messaging state for the user on the client device 420. These sync directives 476 are then provided to the gateway 440. The gateway 440 then provides the sync directives 476 to the client device 420 in a sync delivery 479, which executes them to update its local messaging database.

Figure 5:
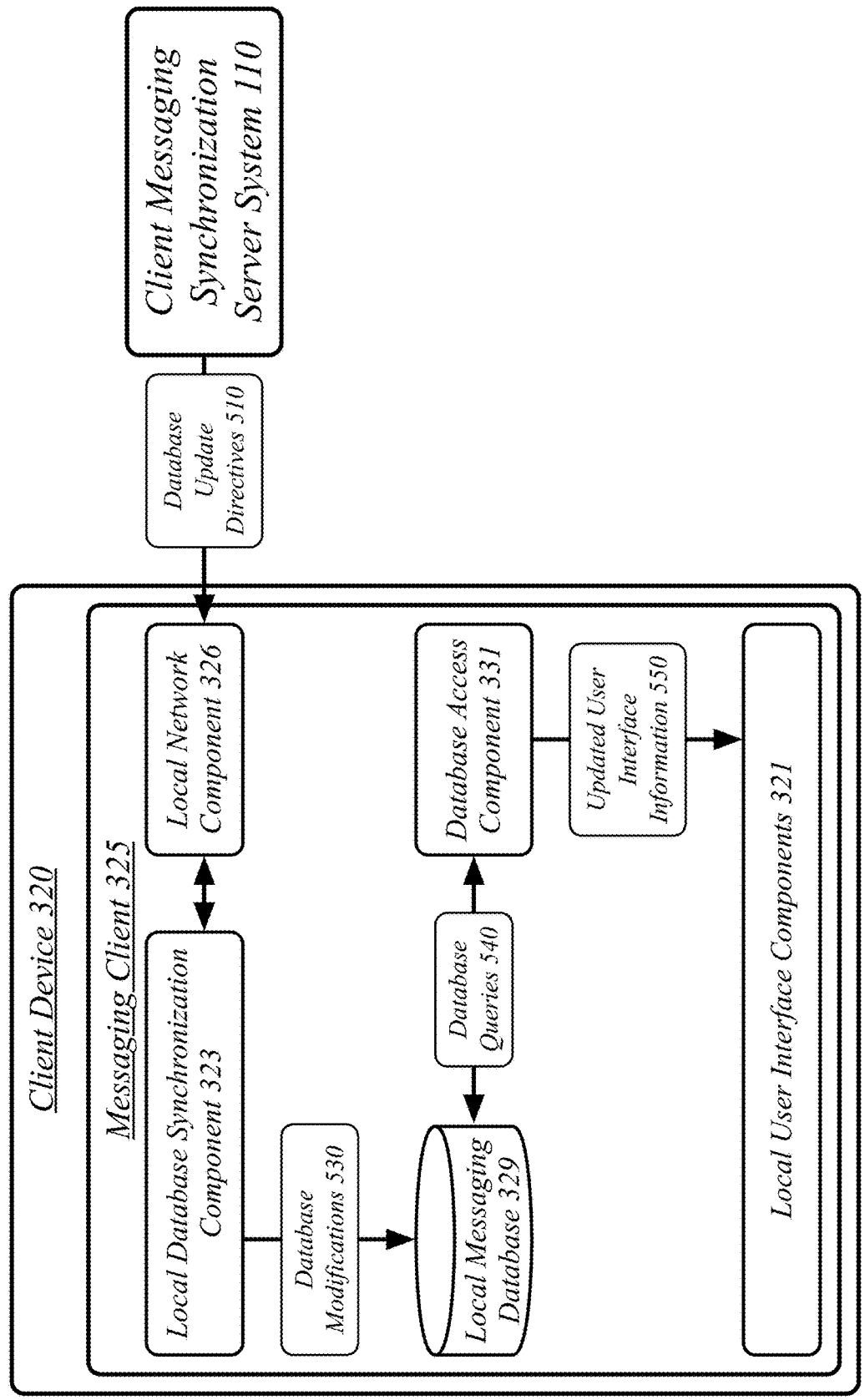
FIG. 5 illustrates an embodiment of an database-based update to local user interface components of a messaging client.

FIG. 5 illustrates an embodiment of an database-based update to local user interface components 321 of a messaging client 325.

The client messaging synchronization server system 100 provides database update directives 510 to the messaging client 325 to update the local messaging database 329. The local network component 326 of the messaging client 325 receives the database update directives 510 and provides them to the local database synchronization component 323. The local database synchronization component 323 then executes the database update directives 510 in one or more database modifications 530. These database modifications 530 modify the local messaging database 329 to an updated state. In general, the local messaging database 329 is updated based on a directive package comprising the database update directives 510 directed to a messaging-sync virtual machine of the messaging client 325 on the client device 320.

The database access component 331 determines that the local messaging database 329 of the messaging client 325 on the client device 320 has been updated. The database access component 331 may determine that the local messaging database 329 has been updated based on receiving a database update notification from the local messaging database 329 or the local database synchronization component 323. In some embodiments, the local database synchronization component 323 is operative to notify the database access component 331 after it has performed database modifications 320 to trigger the database access component 331 updating the local user interface component 321.

The database access component 331 examines the local messaging database 329 to determine a set of database queries 540 to rerun for a plurality of local user interface components 321. The database queries 540 are used to translate the raw data of the local messaging database 329 as modified by the database modifications 530 to the structure used by the local user interface components 321. The database access component 331 provides the updated user interface information 550 to the local user interface components 321 for updating of the user interface for the user to reflect the updated state after the execution of the database update directives 510.

To determine the set of database queries 540 to rerun, the database access component 331 performs a series of steps. The database access component 331 determines a set of modified database elements, wherein these modified database elements were modified when the local messaging database 329 of the messaging client 325 on the client database 320 was updated based on the database update directives 510. These modified database elements of the local messaging database 329 may be flagged per-row with a modification-indication bit by the local database synchronization component 323 to aid the database access component 331 in identifying the modified database elements. The database access component 331 is operative to query the local messaging database 329 for those rows with a set modification-indication bit.

The database access component 331 then compares the set of modified database elements to a database element mapping table to generate the set of database queries 540. The database element mapping table lists relationships between database elements and database queries. The database element mapping table is generated at a compile time for the messaging client 325. When the messaging client 325 is compiled a reverse mapping of database elements modified by each database query of a total set of database queries used by the messaging client 325 is determined. The database elements modified by each database query of the total set of database queries is determined based on a database traversal of database views and/or database tables used by each database query of the total set of database queries. Each of the database queries is run and the database views and/or tables used by those database queries is recorded. This produces a list of relationships from each database query of the total set of database queries to the database views and/or tables used. This relationship may then be reversed to provide a mapping from database tables and/or views back to database queries. The database access component 331 then identifies the plurality of local user interface components to be updated based on the plurality of local user interface components being associated with the set of database queries. These database elements may comprise one or more of database tables and database views.

The database access component 331 generates an updated query list representing the set of database queries 540. The updated query list comprises identifiers for each of the database queries 540 updated by the database modifications 530 invoked by the database update directives 510. The database access component 331 then provides the updated query list to the plurality of local user interface components 321. The plurality of local user interface components 321 are operative to identify relevant database queries of the set of database queries 540 and refresh using the relevant database queries. Each local user interface component maintains its own list of relevant database queries: database queries used to determine the state of the local user interface component. When provided with the updated query list each local user interface component compared the updated query list to its internal list of component-relevant database queries. Any database queries in the updated query list relevant to the local user interface component are then rerun by the database access component 331 on request of the local user interface component. The plurality of local user interface components 321 refresh based on running the set of database queries 540 against the local messaging database 329.

Refreshing the plurality of local user interface components 321 based on running the set of database queries 540 against the local messaging database 329 comprises a series of steps. The database access component 331 performs the set of database queries 540 with the local messaging database 329 to generate a set of updated database responses. The local user interface components 321 each then compare the updated database responses for each local user interface component to previous database responses for each local user interface component. The local user interface components 321 then modify a user interface state for each of the plurality of local user interface components based on the comparing of the updated database responses for each local user interface component to the previous database responses for each local user interface component. Each of the updated database responses is represented as a memory structure which may be compared to a cached memory structure for the previous database responses.

The user of the messaging client 325 may interact with the local user interface component 321. These interactions result in modifications to the local messaging database 329. These interactions may comprise sending a message, adding a contact, sending a friend request, accepting a friend request, reading a message (and therefore changing its read state), viewing a message thread (and therefore changings its read state), and/or any other messaging interaction, social messaging interaction, or other interaction.

In some instances a user interaction with the user interface of the messaging client 325 may result in the creation of a database item in the local messaging database 329. The messaging synchronization system 100 may place the source of truth for the state of a user account with the client messaging synchronization server system 110. As such, permanent identifiers for database items may be assigned by the client messaging synchronization server system 110 with the messaging client 325 only authorized to assign temporary identifiers. Similarly, database items may only be temporary until received from the client messaging synchronization server system 110.

As such, the database access component 331 may generate a temporary database item on the client device. This database item is indexed by a temporary identifier assigned by the database access component 331. This temporary database item, with its assigned temporary identifier, is provided to the client messaging synchronization server system 110 by the local database synchronization component 323 sending the temporary database item via the local network component 326 to the client messaging synchronization server system 110. The client messaging synchronization server system 110 generates a canonical replacement database item to replace the temporary database item. The replacement database item is assigned a permanent identifier by the client messaging synchronization server system 110.

The local network component 326 receives the replacement database item corresponding to the temporary database item from a messaging server of the client messaging synchronization server system 110. The replacement database item is indexed by a permanent identifier. The replacement database item also comprises the temporary identifier as a secondary identifier in a separate database field than the permanent identifier. This replacement database item is received as other updates to the local messaging database 329, via database update directives. The local database synchronization component 323 executes the database update directives 510, which comprise instructions to delete the temporary database item from the local messaging database 329 and add the replacement database item to the local messaging database 329, thereby replacing the temporary database item with the replacement database item.

The database queries 540 are configured to accommodate this replacement. One or more database queries of the set of database queries 540 may be operative to retrieve the replacement database item in place of the temporary database item based on using the temporary identifier as a secondary identifier in response to a failed retrieval based on the temporary identifier as a primary identifier. The query specifies the temporary identifier as the primary lookup for the desired database item based on that temporary identifier having been used to create the temporary database item. However, with the temporary database item having been deleted as part of the database update directives 510, this lookup will fail. The query is configured to then use the temporary identifier as a secondary identifier so as to retrieve the replacement database item that is primarily identified by the replacement identifier, but uses the temporary identifier as a secondary identifier in a secondary identifier field.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may determine that a local messaging database of a messaging client on a client device has been updated at block 602.

The logic flow 600 may examine the local messaging database to determine a set of database queries to rerun for a plurality of local user interface components at block 604.

The logic flow 600 may refresh the plurality of local user interface components based on running the set of database queries against the local messaging database at block 606.

The embodiments are not limited to this example.

Figure 7:
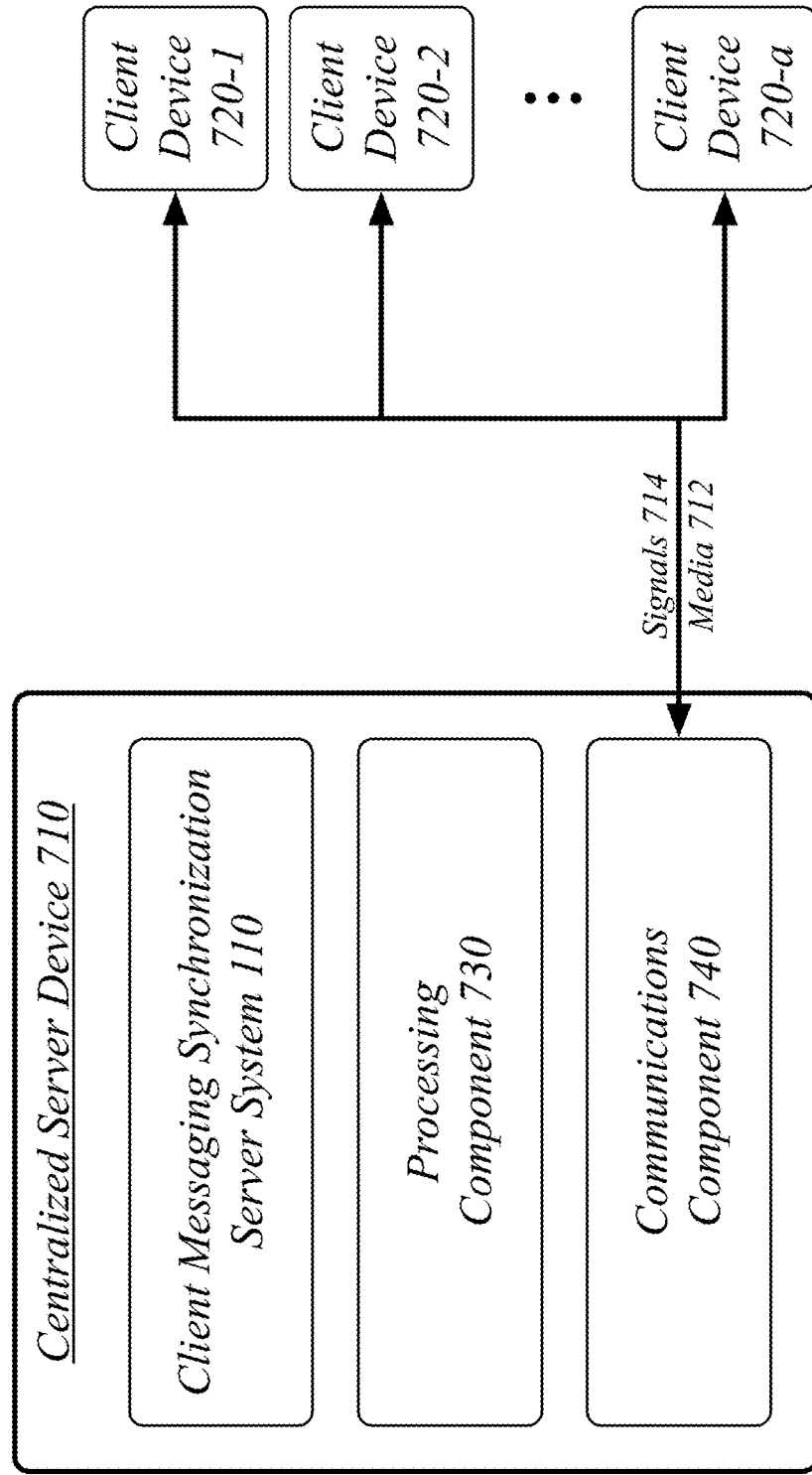
FIG. 7 illustrates an embodiment of a centralized system for the system of FIG. 1.

FIG. 7 illustrates a block diagram of a centralized system 700. The centralized system 700 may implement some or all of the structure and/or operations for the messaging synchronization system 100 in a single computing entity, such as entirely within a single centralized server device 710.

The centralized server device 710 may comprise any electronic device capable of receiving, processing, and sending information for the messaging synchronization system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 710 may execute processing operations or logic for the messaging synchronization system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 710 may execute communications operations or logic for the messaging synchronization system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 710 may implement the client messaging synchronization server system 110. The centralized server device 710 may communicate with a plurality of client devices 720 over a communications media 712 using communications signals 714 via the communications component 740. The client devices 720 receive messaging services from the client messaging synchronization server system 110. The signals 714 sent over media 712 may comprise directives sent from the client messaging synchronization server system 110 to client devices 720, update requests and outgoing database updates from the client devices 720 to the client messaging synchronization server system 110, and/or other messaging data.

Figure 8:
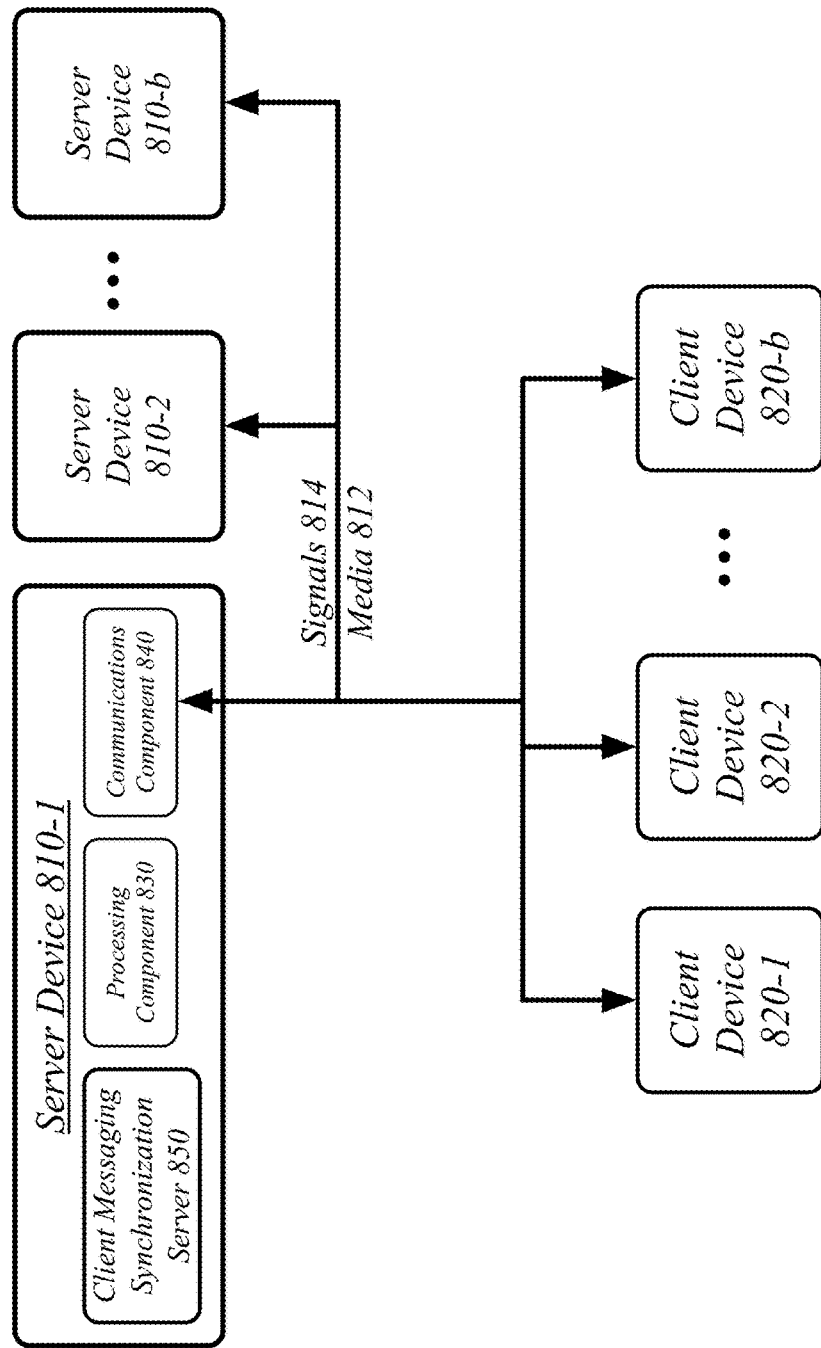
FIG. 8 illustrates an embodiment of a distributed system for the system of FIG. 1.

FIG. 8 illustrates a block diagram of a distributed system 800. The distributed system 800 may distribute portions of the structure and/or operations for the messaging synchronization system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 81. In general, the plurality of server devices 810 may be the same or similar to the centralized server device 710 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The server devices 810 may each execute a client messaging synchronization server 850 corresponding to the client messaging synchronization server system 100 as described with references to FIG. 1. The client messaging synchronization servers may execute one or more server-side client communication components, server-side client database management components, message queue management components, message queues, message backend stores, client information stores, and/or any other messaging servers.

The server devices 810 may communicate with a plurality of client devices 820 over a communications media 812 using communications signals 814 via the communications component 840. The client devices 820 receive messaging services from the client messaging synchronization servers. The signals 814 sent over media 812 may comprise directives sent from the client messaging synchronization servers to client devices 820, update requests and outgoing database updates from the client devices 820 to the client messaging synchronization servers, and/or other messaging data.

Figure 9:
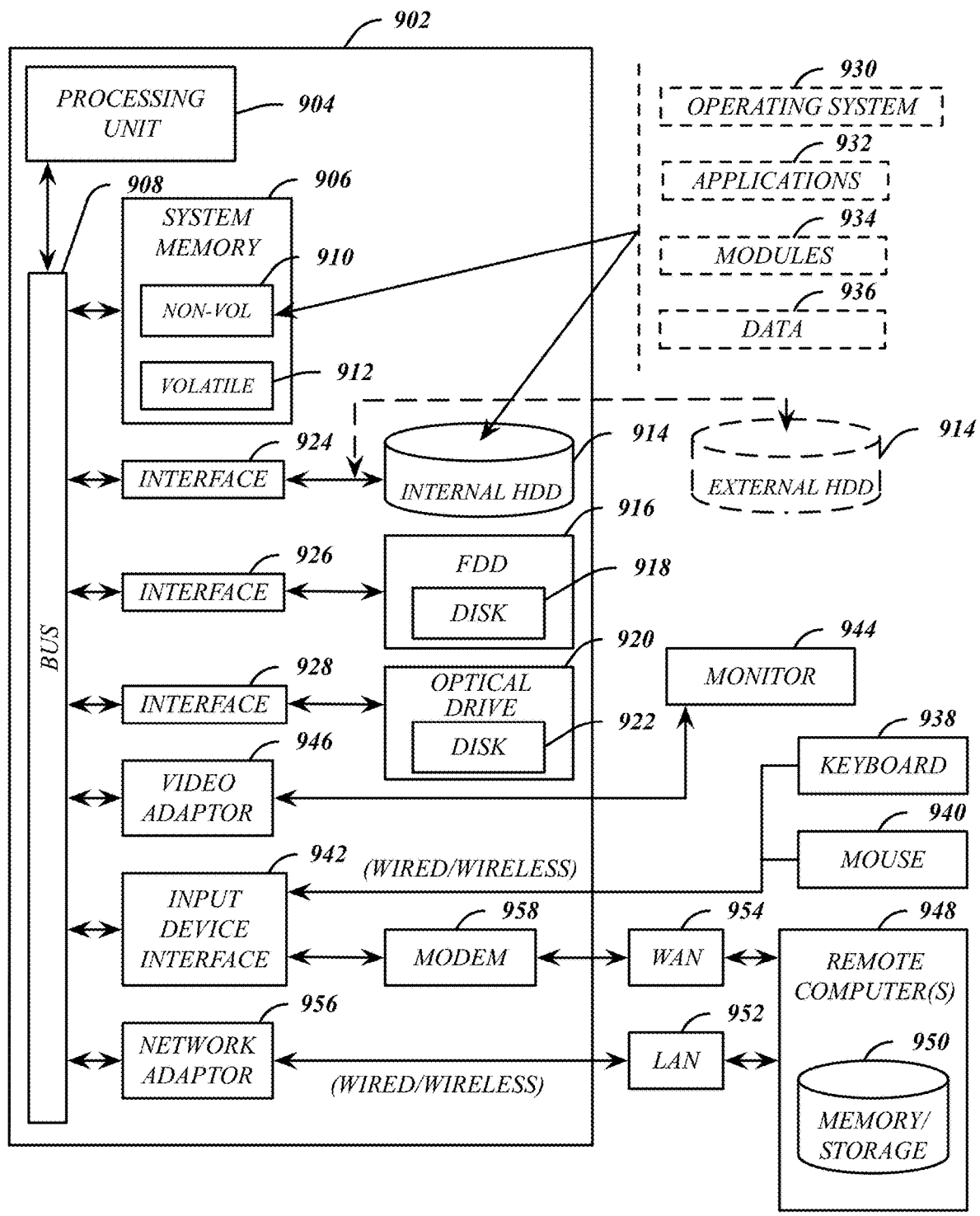
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the messaging synchronization system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
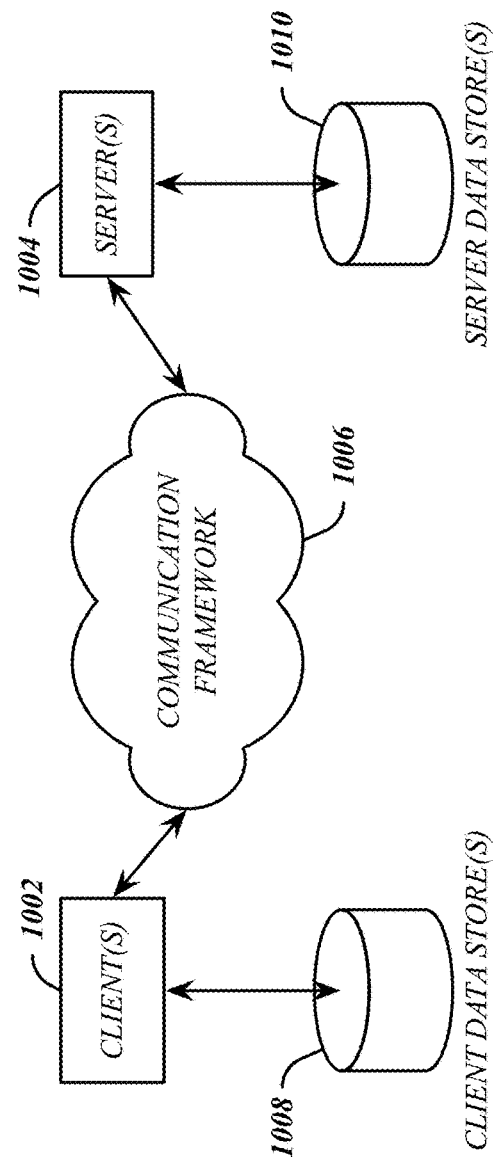
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may comprise messaging client. The servers 1004 may comprise messaging servers. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
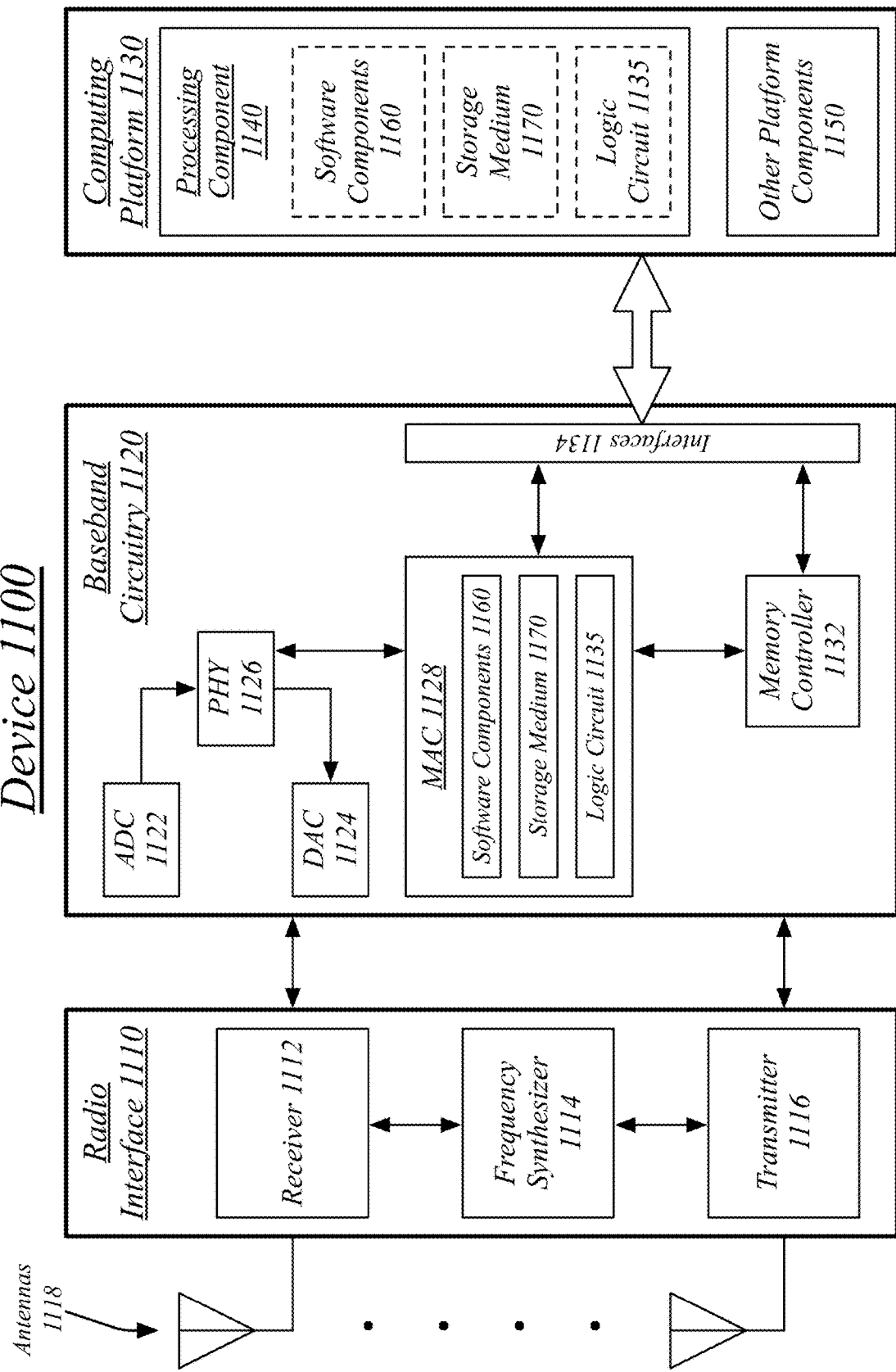
FIG. 11 illustrates an embodiment of a radio device architecture.

FIG. 11 illustrates an embodiment of a device 1100 for use in a multicarrier OFDM system, such as the messaging synchronization system 100. Device 1100 may implement, for example, software components 1160 as described with reference to messaging synchronization system 100 and/or a logic circuit 1135. The logic circuit 1135 may include physical circuits to perform operations described for the messaging synchronization system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the messaging synchronization system 100 and/or logic circuit 1135 in a single computing entity, such as entirely within a single device. Alternatively, the device 1100 may distribute portions of the structure and/or operations for the messaging synchronization system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the messaging synchronization system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   determining that a local messaging database of a messaging client on a client device has been updated;
   on the client device, generating a temporary database item indexed by a temporary identifier, and receiving a replacement database item corresponding to the temporary database item from a messaging server, the replacement database item indexed by a permanent identifier and comprising the temporary identifier as a secondary identifier;
   replacing the temporary database item in the local messaging database with the replacement database item;
   failing to retrieve the replacement database item using a database query for a local user interface component using the temporary identifier as a primary identifier; and
   retrieving the replacement database item in place of the temporary database item based on using the temporary identifier as a secondary identifier.

2. The method of claim 1, wherein:
   the generating and receiving are performed by the messaging client, and
   replacing the temporary database item with the replacement database item comprises deleting the temporary database item from the local messaging database, and adding the replacement database item to the local messaging database; further comprising:
   examining the local messaging database to determine a set of database queries to rerun for a plurality of local user interface components; and
   refreshing the plurality of local user interface components based on running the set of database queries against the local messaging database.

3. The method of claim 2, wherein examining the local messaging database to determine the set of database queries to rerun comprises:
   determining a set of modified database elements, wherein the modified database elements were modified when the local messaging database of the messaging client on the client database was updated; and
   comparing the set of modified database elements to a database element mapping table to generate the set of database queries, wherein the database element mapping table lists relationships between database elements and database queries.

4. The method of claim 3, wherein modified database elements of the local messaging database are flagged per-row with a modification-indication bit.

5. The method of claim 3, the database element mapping table generated at a compile time for the messaging client based on a reverse mapping of database elements modified by each database query of a total set of database queries used by the messaging client, wherein the database elements modified by each database query of the total set of database queries is determined based on a database traversal of database views and/or database tables used by each database query of the total set of database queries.

6. The method of claim 2, further comprising:
   generating an updated query list representing the set of database queries; and
   providing the updated query list to the plurality of local user interface components, wherein the plurality of local user interface components are operative to identify relevant database queries of the set of database queries and refresh using the relevant database queries.

7. The method of claim 2, wherein refreshing the plurality of local user interface components based on running the set of database queries against the local messaging database comprises:

performing the set of database queries with the local messaging database to generate a set of updated database responses;

comparing, at the local user interface components, the updated database responses for each local user interface component to previous database responses for each local user interface component; and modifying a user interface state for each of the plurality of local user interface components based on the comparing of the updated database responses for each local user interface component to the previous database responses for each local user interface component.

8. The method of claim 1, the local messaging database updated based on a directive package directed to a messaging-sync virtual machine of the messaging client on the client device.

9. A client device apparatus, comprising:
a non-transitory computer-readable storage medium storing a local messaging database for a messaging client on the client device; and
a processor circuit configured to:
determine that the local messaging database has been updated;
on the client device, generate a temporary database item indexed by a temporary identifier, and receive a replacement database item corresponding to the temporary database item from a messaging server, the replacement database item indexed by a permanent identifier and comprising the temporary identifier as a secondary identifier;
replace the temporary database item in the local messaging database with the replacement database item;
fail to retrieve the replacement database item using a database query for a local user interface component using the temporary identifier as a primary identifier; and
retrieve the replacement database item in place of the temporary database item based on using the temporary identifier as a secondary identifier.

10. The apparatus of claim 9, wherein:
the processor circuit is configured to perform the generating and receiving at the messaging client;
replacing the temporary database item with the replacement database item comprises deleting the temporary database item from the local messaging database, and adding the replacement database item to the local messaging database; and
the processor circuit is further configured to: examine the local messaging database to determine a set of database queries to rerun for a plurality of local user interface components; and
refresh the plurality of local user interface components based on running the set of database queries against the local messaging database.

11. The apparatus of claim 10, wherein examining the local messaging database to determine the set of database queries to rerun comprises:
determining a set of modified database elements, wherein the modified database elements were modified when the local messaging database of the messaging client on the client database was updated; and compare the set of modified database elements to a database element mapping table to generate the set of database queries, wherein the database element mapping table lists relationships between database elements and database queries.

12. The apparatus of claim 11, wherein modified database elements of the local messaging database are flagged per-row with a modification-indication bit, the database element mapping table generated at a compile time for the messaging client based on a reverse mapping of database elements modified by each database query of a total set of database queries used by the messaging client, wherein the database elements modified by each database query of the total set of database queries is determined based on a database traversal of database views and/or database tables used by each database query of the total set of database queries.

13. The apparatus of claim 10, the processor circuit further configured to:
generate an updated query list representing the set of database queries; and provide the updated query list to the plurality of local user interface components; and
identify relevant database queries of the set of database queries; and refresh using the relevant database queries.

14. The apparatus of claim 9, wherein refreshing the plurality of local user interface components based on running the set of database queries against the local messaging database comprises:
performing the set of database queries with the local messaging database to generate a set of updated database responses; and
comparing the updated database responses for each local user interface component to previous database responses for each local user interface component; and
modify a user interface state for each of the plurality of local user interface components based on the comparing of the updated database responses for each local user interface component to the previous database responses for each local user interface component.

15. At least one non-transitory computer-readable storage medium comprising instructions that, when executed, cause a system to:
determine that a local messaging database of a messaging client on a client device has been updated;
on the client device, generating a temporary database item indexed by a temporary identifier, and receiving a replacement database item corresponding to the temporary database item from a messaging server, the replacement database item indexed by a permanent identifier and comprising the temporary identifier as a secondary identifier;
replacing the temporary database item in the local messaging database with the replacement database item;
failing to retrieve the replacement database item using a database query for a local user interface component using the temporary identifier as a primary identifier; and
retrieving the replacement database item in place of the temporary database item based on using the temporary identifier as a secondary identifier.

16. The computer-readable storage medium of claim 15, wherein:
the generating and receiving are performed by the messaging client, and
replacing the temporary database item with the replacement database item comprises deleting the temporary database item from the local messaging database, and adding the replacement database item to the local messaging database; and further storing instructions for:
examining the local messaging database to determine a set of database queries to rerun for a plurality of local user interface components; and refreshing the plurality of local user interface components based on running the set of database queries against the local messaging database.

17. The computer-readable storage medium of claim 16, wherein examining the local messaging database to determine the set of database queries to rerun comprises further instructions that, when executed, cause a system to:
  determine a set of modified database elements, wherein the modified database elements were modified when the local messaging database of the messaging client on the client database was updated; and
  compare the set of modified database elements to a database element mapping table to generate the set of database queries, wherein the database element mapping table lists relationships between database elements and database queries.

18. The computer-readable storage medium of claim 17, wherein modified database elements of the local messaging database are flagged per-row with a modification-indication bit, the database element mapping table generated at a compile time for the messaging client based on a reverse mapping of database elements modified by each database query of a total set of database queries used by the messaging client, wherein the database elements modified by each database query of the total set of database queries is determined based on a database traversal of database views and/or database tables used by each database query of the total set of database queries.

19. The computer-readable storage medium of claim 16, comprising further instructions that, when executed, cause a system to:
  generate an updated query list representing the set of database queries; and
  provide the updated query list to the plurality of local user interface components, wherein the plurality of local user interface components are operative to identify relevant database queries of the set of database queries and refresh using the relevant database queries.

20. The computer-readable storage medium of claim 16, wherein refreshing the plurality of local user interface components based on running the set of database queries against the local messaging database comprises further instructions that, when executed, cause a system to:
  perform the set of database queries with the local messaging database to generate a set of updated database responses;
  compare, at the local user interface components, the updated database responses for each local user interface component to previous database responses for each local user interface component; and
  modify a user interface state for each of the plurality of local user interface components based on the comparing of the updated database responses for each local user interface component to the previous database responses for each local user interface component.

* * * * *